Nov. 3, 1964 F. M. GOETZ 3,155,819

ERROR CORRECTING SYSTEM

Filed May 15, 1961 6 Sheets-Sheet 1

FIG. 1A

N=30, E=3

| ROW | NUMBER OF CONSECUTIVELY RECEIVED DIGITS | ORDER OF RECEPTION BY DECODER | | | | | | | | | | | | | | | | | CASE |
|---|---|---|---|---|---|---|---|---|---|---|---|---|---|---|---|---|---|---|---|
| | | 33 | 32 | 31 | 30 | 29 | 28 | 27 | 26 | 25 | --- | 7 | 6 | 5 | 4 | 3 | 2 | 1 | |
| 1 | 27 | | | | | | | $x_{27}$ | $x_{26}$ | $x_{25}$ | --- | $x_7$ | $x_6$ | $x_5$ | $x_4$ | $x_3$ | $x_2$ | $x_1$ | 1 |
| 2 | | | | | | | | $x_{28}$ | $x_{27}$ | $x_{26}$ | --- | $x_8$ | $x_7$ | $x_6$ | $x_5$ | $x_4$ | $x_3$ | $x_2$ | 2 |
| 3 | | | | | | | | $x_{29}$ | $x_{28}$ | $x_{27}$ | --- | $x_9$ | $x_8$ | $x_7$ | $x_6$ | $x_5$ | $x_4$ | $x_3$ | 3 |
| 4 | | | | | | | | $x_{30}$ | $x_{29}$ | $x_{28}$ | --- | $x_{10}$ | $x_9$ | $x_8$ | $x_7$ | $x_6$ | $x_5$ | $x_4$ | 4 |
| 5 | 28 | | | | | | $x_{28}$ | $x_{27}$ | $x_{26}$ | $x_{25}$ | --- | $x_7$ | $x_6$ | $x_5$ | $x_4$ | $x_3$ | $x_2$ | $x_1^*$ | 1 |
| 6 | | | | | | | $x_{28}^*$ | $x_{27}$ | $x_{26}$ | $x_{25}$ | --- | $x_7$ | $x_6$ | $x_5$ | $x_4$ | $x_3$ | $x_2$ | $x_1$ | 2 |
| 7 | | | | | | | $x_{29}$ | $x_{28}$ | $x_{27}$ | $x_{26}$ | --- | $x_8$ | $x_7$ | $x_6$ | $x_5$ | $x_4$ | $x_3$ | $x_2^*$ | 3 |
| 8 | | | | | | | $x_{29}^*$ | $x_{28}$ | $x_{27}$ | $x_{26}$ | --- | $x_8$ | $x_7$ | $x_6$ | $x_5$ | $x_4$ | $x_3$ | $x_2$ | 4 |
| 9 | | | | | | | $x_{30}$ | $x_{29}$ | $x_{28}$ | $x_{27}$ | --- | $x_9$ | $x_8$ | $x_7$ | $x_6$ | $x_5$ | $x_4$ | $x_3^*$ | 5 |
| 10 | | | | | | | $x_{30}^*$ | $x_{29}$ | $x_{28}$ | $x_{27}$ | --- | $x_9$ | $x_8$ | $x_7$ | $x_6$ | $x_5$ | $x_4$ | $x_3$ | 6 |
| 11 | 29 | | | | | $x_{28}$ | $x_{27}$ | $x_{26}$ | $x_{25}$ | $x_{24}$ | --- | $x_6$ | $x_5$ | $x_4$ | $x_3$ | $x_2$ | $x_1$ | g | 1 |
| 12 | | | | | | $x_{29}$ | $x_{28}$ | $x_{27}$ | $x_{26}$ | $x_{25}$ | --- | $x_7$ | $x_6$ | $x_5$ | $x_4$ | $x_3$ | $x_2^*$ | $x_1^*$ | 2 |
| 13 | | | | | | $x_{29}^*$ | $x_{28}$ | $x_{27}$ | $x_{26}$ | $x_{25}$ | --- | $x_7$ | $x_6$ | $x_5$ | $x_4$ | $x_3$ | $x_2$ | $x_1^*$ | 3 |
| 14 | | | | | | $x_{29}^*$ | $x_{28}^*$ | $x_{27}$ | $x_{26}$ | $x_{25}$ | --- | $x_7$ | $x_6$ | $x_5$ | $x_4$ | $x_3$ | $x_2$ | $x_1$ | 4 |
| 15 | | | | | | $x_{30}$ | $x_{29}$ | $x_{28}$ | $x_{27}$ | $x_{26}$ | --- | $x_8$ | $x_7$ | $x_6$ | $x_5$ | $x_4$ | $x_3^*$ | $x_2^*$ | 5 |
| 16 | | | | | | $x_{30}^*$ | $x_{29}$ | $x_{28}$ | $x_{27}$ | $x_{26}$ | --- | $x_8$ | $x_7$ | $x_6$ | $x_5$ | $x_4$ | $x_3$ | $x_2^*$ | 6 |
| 17 | | | | | | $x_{30}^*$ | $x_{29}^*$ | $x_{28}$ | $x_{27}$ | $x_{26}$ | --- | $x_8$ | $x_7$ | $x_6$ | $x_5$ | $x_4$ | $x_3$ | $x_2$ | 7 |
| 18 | | | | | | g | $x_{30}$ | $x_{29}$ | $x_{28}$ | $x_{27}$ | --- | $x_9$ | $x_8$ | $x_7$ | $x_6$ | $x_5$ | $x_4$ | $x_3$ | 8 |
| 19 | 30 | | | | $x_{29}$ | $x_{28}$ | $x_{27}$ | $x_{26}$ | $x_{25}$ | $x_{24}$ | --- | $x_6$ | $x_5$ | $x_4$ | $x_3$ | $x_2$ | $x_1^*$ | g | 1 |
| 20 | | | | | $x_{29}^*$ | $x_{28}$ | $x_{27}$ | $x_{26}$ | $x_{25}$ | $x_{24}$ | --- | $x_6$ | $x_5$ | $x_4$ | $x_3$ | $x_2$ | $x_1$ | g | 2 |
| 21 | | | | | $x_{30}$ | $x_{29}$ | $x_{28}$ | $x_{27}$ | $x_{26}$ | $x_{25}$ | --- | $x_7$ | $x_6$ | $x_5$ | $x_4$ | $x_3^*$ | $x_2^*$ | $x_1^*$ | 3 |
| 22 | | | | | $x_{30}^*$ | $x_{29}$ | $x_{28}$ | $x_{27}$ | $x_{26}$ | $x_{25}$ | --- | $x_7$ | $x_6$ | $x_5$ | $x_4$ | $x_3$ | $x_2^*$ | $x_1^*$ | 4 |
| 23 | | | | | $x_{30}^*$ | $x_{29}^*$ | $x_{28}$ | $x_{27}$ | $x_{26}$ | $x_{25}$ | --- | $x_7$ | $x_6$ | $x_5$ | $x_4$ | $x_3$ | $x_2$ | $x_1^*$ | 5 |
| 24 | | | | | $x_{30}^*$ | $x_{29}^*$ | $x_{28}^*$ | $x_{27}$ | $x_{26}$ | $x_{25}$ | --- | $x_7$ | $x_6$ | $x_5$ | $x_4$ | $x_3$ | $x_2$ | $x_1$ | 6 |
| 25 | | | | | g | $x_{30}$ | $x_{29}$ | $x_{28}$ | $x_{27}$ | $x_{26}$ | --- | $x_8$ | $x_7$ | $x_6$ | $x_5$ | $x_4$ | $x_3$ | $x_2^*$ | 7 |
| 26 | | | | | g | $x_{30}^*$ | $x_{29}$ | $x_{28}$ | $x_{27}$ | $x_{26}$ | --- | $x_8$ | $x_7$ | $x_6$ | $x_5$ | $x_4$ | $x_3$ | $x_2$ | 8 |

INVENTOR
F. M. GOETZ
BY Lucian C. Canepa
ATTORNEY

FIG. 1B

| ROW | NUMBER OF CONSECUTIVELY RECEIVED DIGITS | ORDER OF RECEPTION BY DECODER | | | | | | | | | | | | | | | | | | CASE |
|---|---|---|---|---|---|---|---|---|---|---|---|---|---|---|---|---|---|---|---|---|
| | | 33 | 32 | 31 | 30 | 29 | 28 | 27 | 26 | 25 | --- | 8 | 7 | 6 | 5 | 4 | 3 | 2 | 1 | |
| 27 | 31 | | | $x_{29}$ | $x_{28}$ | $x_{27}$ | $x_{26}$ | $x_{25}$ | $x_{24}$ | $x_{23}$ | --- | $x_6$ | $x_5$ | $x_4$ | $x_3$ | $x_2$ | $x_1$ | $g$ | $g$ | 1 |
| 28 | | | | $x_{30}$ | $x_{29}$ | $x_{28}$ | $x_{27}$ | $x_{26}$ | $x_{25}$ | $x_{24}$ | --- | $x_7$ | $x_6$ | $x_5$ | $x_4$ | $x_3$ | $x_2^*$ | $x_1^*$ | $g$ | 2 |
| 29 | | | | $x_{30}^*$ | $x_{29}$ | $x_{28}$ | $x_{27}$ | $x_{26}$ | $x_{25}$ | $x_{24}$ | --- | $x_7$ | $x_6$ | $x_5$ | $x_4$ | $x_3$ | $x_2$ | $x_1^*$ | $g$ | 3 |
| 30 | | | | $x_{30}^*$ | $x_{29}^*$ | $x_{28}$ | $x_{27}$ | $x_{26}$ | $x_{25}$ | $x_{24}$ | --- | $x_7$ | $x_6$ | $x_5$ | $x_4$ | $x_3$ | $x_2$ | $x_1$ | $g$ | 4 |
| 31 | | | | $g$ | $x_{30}$ | $x_{29}$ | $x_{28}$ | $x_{27}$ | $x_{26}$ | $x_{25}$ | --- | $x_8$ | $x_7$ | $x_6$ | $x_5$ | $x_4$ | $x_3$ | $x_2^*$ | $x_1^*$ | 5 |
| 32 | | | | $g$ | $x_{30}^*$ | $x_{29}$ | $x_{28}$ | $x_{27}$ | $x_{26}$ | $x_{25}$ | --- | $x_8$ | $x_7$ | $x_6$ | $x_5$ | $x_4$ | $x_3$ | $x_2$ | $x_1^*$ | 6 |
| 33 | | | | $g$ | $x_{30}^*$ | $x_{29}^*$ | $x_{28}$ | $x_{27}$ | $x_{26}$ | $x_{25}$ | --- | $x_8$ | $x_7$ | $x_6$ | $x_5$ | $x_4$ | $x_3$ | $x_2$ | $x_1$ | 7 |
| 34 | | | | $g$ | $g$ | $x_{30}$ | $x_{29}$ | $x_{28}$ | $x_{27}$ | $x_{26}$ | --- | $x_9$ | $x_8$ | $x_7$ | $x_6$ | $x_5$ | $x_4$ | $x_3$ | $x_2$ | 8 |
| 35 | 32 | | $x_{30}$ | $x_{29}$ | $x_{28}$ | $x_{27}$ | $x_{26}$ | $x_{25}$ | $x_{24}$ | $x_{23}$ | --- | $x_6$ | $x_5$ | $x_4$ | $x_3$ | $x_2$ | $x_1^*$ | $g$ | $g$ | 1 |
| 36 | | | $x_{30}^*$ | $x_{29}$ | $x_{28}$ | $x_{27}$ | $x_{26}$ | $x_{25}$ | $x_{24}$ | $x_{23}$ | --- | $x_6$ | $x_5$ | $x_4$ | $x_3$ | $x_2$ | $x_1$ | $g$ | $g$ | 2 |
| 37 | | | $g$ | $x_{30}$ | $x_{29}$ | $x_{28}$ | $x_{27}$ | $x_{26}$ | $x_{25}$ | $x_{24}$ | --- | $x_7$ | $x_6$ | $x_5$ | $x_4$ | $x_3$ | $x_2$ | $x_1^*$ | $g$ | 3 |
| 38 | | | $g$ | $x_{30}^*$ | $x_{29}$ | $x_{28}$ | $x_{27}$ | $x_{26}$ | $x_{25}$ | $x_{24}$ | --- | $x_7$ | $x_6$ | $x_5$ | $x_4$ | $x_3$ | $x_2$ | $x_1$ | $g$ | 4 |
| 39 | | | $g$ | $g$ | $x_{30}$ | $x_{29}$ | $x_{28}$ | $x_{27}$ | $x_{26}$ | $x_{25}$ | --- | $x_8$ | $x_7$ | $x_6$ | $x_5$ | $x_4$ | $x_3$ | $x_2$ | $x_1^*$ | 5 |
| 40 | | | $g$ | $g$ | $x_{30}^*$ | $x_{29}$ | $x_{28}$ | $x_{27}$ | $x_{26}$ | $x_{25}$ | --- | $x_8$ | $x_7$ | $x_6$ | $x_5$ | $x_4$ | $x_3$ | $x_2$ | $x_1$ | 6 |
| 41 | 33 | $x_{30}$ | $x_{29}$ | $x_{28}$ | $x_{27}$ | $x_{26}$ | $x_{25}$ | $x_{24}$ | $x_{23}$ | $x_{22}$ | --- | $x_5$ | $x_4$ | $x_3$ | $x_2$ | $x_1$ | $g$ | $g$ | $g$ | 1 |
| 42 | | $g$ | $x_{30}$ | $x_{29}$ | $x_{28}$ | $x_{27}$ | $x_{26}$ | $x_{25}$ | $x_{24}$ | $x_{23}$ | --- | $x_6$ | $x_5$ | $x_4$ | $x_3$ | $x_2$ | $x_1$ | $g$ | $g$ | 2 |
| 43 | | $g$ | $g$ | $x_{30}$ | $x_{29}$ | $x_{28}$ | $x_{27}$ | $x_{26}$ | $x_{25}$ | $x_{24}$ | --- | $x_7$ | $x_6$ | $x_5$ | $x_4$ | $x_3$ | $x_2$ | $x_1$ | $g$ | 3 |
| 44 | | $g$ | $g$ | $g$ | $x_{30}$ | $x_{29}$ | $x_{28}$ | $x_{27}$ | $x_{26}$ | $x_{25}$ | --- | $x_8$ | $x_7$ | $x_6$ | $x_5$ | $x_4$ | $x_3$ | $x_2$ | $x_1$ | 4 |

INVENTOR
F. M. GOETZ
BY Lucian C. Canepa
ATTORNEY

ERROR CORRECTING SYSTEM

Filed May 15, 1961

6 Sheets-Sheet 3

INVENTOR
F. M. GOETZ
BY Lucian C. Canepa
ATTORNEY

ERROR CORRECTING SYSTEM

INVENTOR
F. M. GOETZ
BY Lucian C. Canepa
ATTORNEY

Nov. 3, 1964 F. M. GOETZ 3,155,819

ERROR CORRECTING SYSTEM

Filed May 15, 1961 6 Sheets-Sheet 5

INVENTOR
F. M. GOETZ
BY Lucian C. Canepa

ATTORNEY

INVENTOR
F. M. GOETZ
BY Lucian C. Canepa
ATTORNEY 3,155,819
Patented Nov. 3, 1964

3,155,819
ERROR CORRECTING SYSTEM

Frank M. Goetz, Franklin Square, N.Y., assignor to Bell Telephone Laboratories, Incorporated, New York, N.Y., a corporation of New York Filed May 15, 1961, Ser. No. 110,143
15 Claims. (Cl. 235—153)

This invention relates to digital information processing systems, and more particularly to the automatic correction of errors in such systems.

The problem of correctly transmitting binary signals over a noisy channel is a significant one whose solution has been actively sought. Some illustrative situations in which this problem arises are: when telephone lines subject to error impulses are being used to transmit data in binary form; when an imperfect medium such as magnetic tape or a photographic emulsion is used to store binary data; or when operations on binary signals are being carried out by means of circuits constructed of devices such as relays, diodes, or transistors, which have a probability of error.

In a typical information processing system, care must be taken to ensure that the transmitter and receiver thereof stay in synchronism. Without some synchronizing scheme the receiver might start decoding at the wrong instant and, as a result, emit only gibberish.

The occurrence of errors in a typical information processing system may arise from noise impulses which directly alter the digits of a transmitted word. Also, errors in such a system may arise from noise impulses which indirectly alter the correspondence between the encoded and decoded words by throwing the encoder and decoder out of synchronism.

By the use of redundancy, it is possible to encode a message for transmission in such a way that a decoder is able to extract the original information content from the redundant message despite the fact that the message may have been mutilated during transmission.

An object of the present invention is the improvement of the error-correcting capabilities of a digital information processing system.

More specifically, an object of this invention is an error-correcting system in which the number of redundant digits required to be added to an information word is relatively small in view of the error-correcting capabilities of the system.

Another object of the present invention is a reliable and easily implementable digital information processing system which is self-correcting with respect to a large class of multiple errors.

These and other objects of the present invention are realized in an illustrative system embodiment thereof which comprises a source that supplies information words to an encoder, the encoder converting the information words into modified words containing sufficient redundancy to permit the words to be slightly mutilated by a noisy channel and still be correctly interpreted by a decoder. The modified words are sent via the noisy channel to the decoder, which reconstructs the original information words if the mutilation has not been excessive.

In the encoder of the illustrative system, two distinct groups of parity check digits are generated and successively suffixed to a group of $n$ digits which form an information word, the information digits being initially inserted into the stages of a main shift register. One group of check digits is generated by a first plurality of EXCLUSIVE-OR circuits whose inputs are derived from spaced ones of the stages of the main shift register and from a pulse source. The check digits of this group are initially inserted into the stages of an auxiliary shift register and are the last digits to be suffixed to the information word. These check digits establish both even and odd parity relationships between the information digits and the check digits of both groups.

The other group of check digits is generated by a second plurality of EXCLUSIVE-OR circuits whose inputs are derived from different spaced ones of the stages of the main shift register and from the input stage of the auxiliary shift register. The check digits of this group are applied in sequence to the input stage of the main shift register and establish only even parity relationships between the information digits and the check digits of both groups.

An encoded redundant information word comprising $n$ information digits having suffixed thereto two distinct groups of parity check digits is coupled in a serial mode from the terminal output stage of the main shift register to a transmission channel which is subject to error impulses. Synchronization digits, which occur in a predetermined time relationship with respect to the information digits, are also coupled to the channel.

The decoder of the illustrative system includes circuitry for examining the received sequence of digits and determining whether or not an end-connected error burst occurred therein during transmission over the noisy channel. If an end-connected error occurred, the decoder proceeds to locate within the received sequence the position of a reference digit and to then reconstruct the digits preceding the reference one, making the digits of the corrected information word available in selected stages of a two-directional shift register.

If, on the other hand, an end-connected error is not detected by the decoder, circuitry therein determines whether any error at all occurred during transmission. If no error occurred, the correct information digits are available in the selected stages of the two-directional shift register for gating to an external circuit. If, however, an error which is not end-connected in nature occurred, the redundant information word is circulated through the two-directional shift register and in the process of so doing all erroneously-received digits are reconstructed, the digits of the corrected word again being made available in the selected stages of the register.

It is a feature of the present invention that a self-correcting information processing system include circuitry for suffixing to the digits of an information word two distinct groups of parity check digits, one group establishing both even and odd parity relationships between the information digits and the digits of the two parity groups, and the other group establishing only even parity relationships between the information digits and the digits of the two parity groups.

It is another feature of this invention that a self-correcting parity check system include encoding circuitry for suffixing two parity check groups to an information word, the circuitry comprising a main shift register, an auxiliary shift register, a pulse source, a first plurality of EXCLUSIVE-OR circuits for generating one of the check groups and applying the one group to the auxiliary shift register, the inputs to the first plurality of EXCLUSIVE-OR circuits being derived from spaced ones of the stages of the main shift register and from the pulse source, and a second plurality of EXCLUSIVE-OR circuits for generating the other one of the check groups and applying the other group to the main shift register, the inputs to the second plurality of EXCLUSIVE-OR circuits being derived from different spaced ones of the stages of the main shift register and from the input stage of the auxiliary shift register.

It is still another feature of the present invention that a self-correcting digital system include a decoder which comprises circuitry for determining whether a received sequence of digits is characterized by an end-connected or an interior error burst, circuitry responsive to the detection of an end-connected error burst for locating the position in the sequence of a reference digit, and circuitry responsive to the detection of an interior error burst for circulating the sequence through a shift register and in the process of so doing reconstructing all erroneously-received information digits thereof.

Another feature of this invention is that a self-correcting digital system include a decoder which comprises circuitry for detecting the occurrence in a received sequence of digits of an end-connected error and for locating the position in the sequence of a reference information digit, and circuitry responsive to the detection of the occurrence of an end-connected error for reconstructing the information digits preceding the reference one.

A complete understanding of the present invention and of the above and other objects, features, and advantages thereof may be gained from a consideration of the following detailed description of an illustrative embodiment thereof presented hereinbelow in conjunction with the accompanying drawing, in which:

FIGS. 1A and 1B taken together constitute a tabular listing of the various end-connected error bursts that are within the error-correcting capabilities of a specific illustrative system embodiment of the principles of the present invention;

Figure 2:
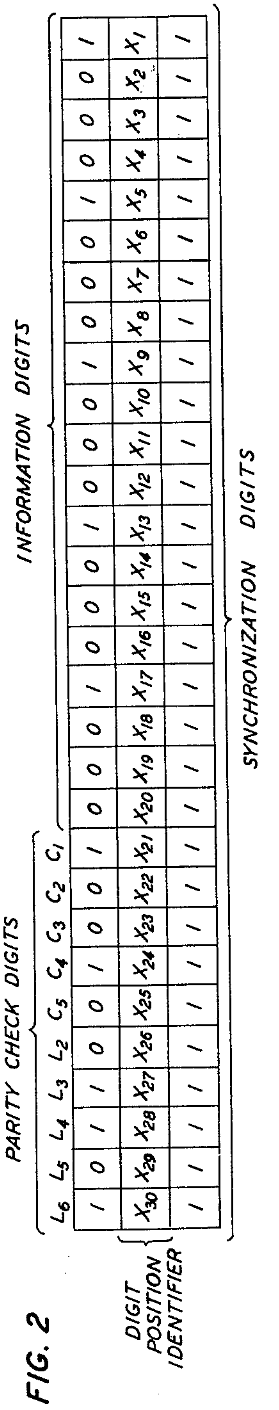
FIG. 2 represents a specific illustrative 30-digit redundant word and its corresponding 30-digit synchronization word.

Before proceeding to a detailed description of a specific illustrative embodiment of the principles of the present invention, there is presented hereinbelow certain general introductory and explanatory material of a background nature which is considered helpful to a complete and clear understanding of the invention. Following that material, an illustrative system embodiment of the principles of this invention is described in detail.

First, a few general words with respect to the type of overall system in which the herein-described inventive principles may be embodied and the type of multiple errors which embodiments of the present invention are capable of automatically correcting. The inventive concepts are illustratively presented herein in the context of a system in which an encoder and a decoder are interconnected by a channel for transmitting therebetween information and check digits and synchronization digits. In the simplest case, this can be accomplished by means of two separate transmission lines interconnecting the encoder and decoder. Herein these two lines will be respectively deignated the information-carrying line and the synchronization line. Normally, the synchronization line carries a pulse or "1" signal in every digit position corresponding in time to the position in which a digit of the redundant word appears on the information-carrying line. Thus, for example, if some 30-digit word 10011 . . . 01, consisting of both information and check digits, appears on the information-carrying line in digit positions 1 through 30, there is propagated along the synchronization line during the same time interval a 30-digit word 11111 . . . 11, consisting only of "1" signals.

A specific illustrative system made in accordance with the principles of the present invention is capable of extracting from a redundant encoded version of an original information word an exact replica of the original information word despite the presence in the encoded word of multiple errors of various types. Such a system is capable of automatically correcting or compensating for all so-called Class-3 error bursts. This class includes four main categories: (1) so-called Class-1 error bursts; (2) so-called Class-2 error bursts; (3) error bursts which do not affect the synchronization digits but which cause certain ones of the information digits to be changed in value; and (4) error bursts which cause "1" signals to be added to or subtracted from end digit positions of the synchronization word and which also cause digits in noncorresponding end positions of the information word to be changed in value.

Class-1 errors are end-connected loss-bursts or gain-bursts, where the sum of the individual burst lengths is $\leqq$ E. For the assumed case of a 30-digit word, E would be 3 digits. Whenever the terms "lost" and "gained" are employed herein with respect to digits, it is to be understood that such reference is with respect to the digits of a synchronization word. It is to be noted, however, that impulses which cause errors to occur in the digits of a synchronization word may also cause errors to occur in corresponding information and check digits appearing on the information-carrying line. However, whether or not the corresponding digits on the information-carrying line are also affected, Class-1 errors would result in the encoded and decoded words not being exact replicas of each other, due to the loss of synchronization therebetween.

More specifically, Class-1 error bursts might, for example, cause the assumed 30-digit synchronization word to lose as many as three consecutive "1's" of its extreme left-hand digits, or as many as three consecutive "1's" of its extreme right-hand digits. Alternatively, by way of further example, one extreme left-hand "1" and two extreme right-hand "1's" might be lost. Or, such noise bursts might, for example, cause as many as three consecutive "1's" to be prefixed or suffixed to the normal synchronization word, or might, illustratively, add a "1" signal as a prefix and two consecutive "1's" as a suffix to the synchronization word.

Class-1 errors occur in those communication systems in which the beginnings and ends of binary sequences are susceptible to error. For example, in a system in which a sequence of pulses is transmitted through a filter, the first few pulses transmitted therethrough may, due to delay in the response characteristic of the filter, be of a lower amplitude than pulses occurring in the middle of the sequence. Similarly, energy storage effects in the filter may cause additional pulses to be added to the end of the desired sequence.

Class-2 errors include all Class-1 errors and, in addition, include interior loss-bursts of length $\leqq$E. Again, for the assumed case of a 30-digit word, E would have the value 3. It is assumed herein that interior loss-bursts cause errors to occur both in the digits of a synchronization word and in the corresponding digits of the information word associated therewith.

For the sake of completeness, it is noted that my copending application Serial No. 110,142, filed concurrently herewith, is directed to systems capable of correcting Class-1 and Class-2 errors.

Category No. 3 encompasses the situation in which all of the synchronization digits are correctly received by the decoder and in which each of a group of $\leqq$E information digits is incorrectly received thereby. The incorrectly-received group of information digits may occur anywhere within the information word. Additionally, it is noted that category No. 3 extends to the case in which erroneous digits occur at each end of the information word, the sum of the two end sub-bursts being $\leqq$E digits in length.

Category No. 4 relates to the case wherein end digits of the synchronization word are lost and noncorresponding end digits of the information word are changed in value, or to the case wherein extraneous "1" signals are added to the synchronization word and end ones of the digits of the information word are changed in value, or to the case wherein (1) the synchronization word with loses and gains end digits and (2) end digits of the information word are changed in value.

The parameter E is employed herein to characterize the burst-correcting properties of the illustrative system embodiment of the principles of the present invention. The system itself-correcting for error bursts of lengths $\leq E$ digits, where the burst length is the distance in digits between and including the first and last digits affected by a noise burst.

Generally speaking, the error-correcting capabilities of an illustrative system made in accordance with the principles of the present invention may be said to extend to both interior and end-connected or terminal error bursts. The above-noted categories 2 and 3 include both interior and terminal error bursts, whereas each of categories 1 and 4 includes only terminal error bursts.

The visualization of what constitutes interior error bursts is considered to be clear in view of the definitions set forth above for categories 2 and 3. However, to aid in a more complete understanding of the various types of terminal error bursts that are included within the error-correcting capabilities of the illustrative system considered herein, there is presented in tabular form in FIGS. 1A and 1B a list of the various possible terminal error bursts of length 3 to which a redundant 30-digit information word and its corresponding 30-digit synchronization word might be subjected during transmission over a noisy channel.

The presence in a particular row of FIGS. 1A and 1B of any of the designations $x_1$ through $x_{30}$ is intended to indicate that the synchronization digits appearing in the designated digit positions were received by the decoder of an illustrative embodiment of the principles of the present invention. For example, row No. 1 includes the designations $x_1$ through $x_{27}$, which indicates that the synchronization digits appearing in digit positions $x_1$ through $x_{27}$ were received and the synchronization digits appearing in digit positions $x_{28}$ through $x_{30}$ were lost. Thus, row No. 1 represents a terminal error burst of the type included in category No. 1. Rows 2 through 4 of FIG. 1A also represent error bursts that fall within category No. 1.

Asterisks have been added to various ones of the digit position designators of FIGS. 1A and1B for the purpose of indicating that the information digits appearing in the asterisked positions were changed in value during transmission. For example, row No. 5 of FIG. 1A represents the situation in which the synchronization digits in positions $x_{29}$ and $x_{30}$ were lost and in which the information digit in position $x_1$ was changed in value. This type of terminal error burst is illustrative of those that fall within category No. 4.

Rows 21 through 24 of FIG. 1A represent the situation in which all of the synchronization digits are correctly received by the decoder but in which end ones of the information digits are incorrectly received thereby. For example, the representation in row No. 22 indicates that all of the synchronization, information, and check digits, except for the information digits in positions $x_1$, $x_2$, and $x_{30}$, were correctly received by the decoder. This type type of error burst is illustrative of those included in category No. 3.

For further illustrative purposes, it is noted that the depiction in row No. 27 of FIG. 1B represents an error burst within category No. 1; the depiction in row No. 31 represents an error burst within category No. 4; and each of rows 41 through 44 represents an error burst within category No. 1. Additionally, the representations in the other nonspecified rows of FIGS. 1A and 1B may in light of the principles and examples set forth above be easily assigned to the four aforementioned categories.

In the illustrative system described herein, an encoded redundant word includes N binary digits, the first $n$ of which are information digits and the remaining $r$ of which are parity check digits. It is noted that the concept of parity and its application to the field of error detection and correction is described in "Error Detecting and Error Correcting Codes," R. W. Hamming, The Bell System Technical Journal, Volume 29, 1950, pages 147–160.

In the system described herein, each transmitted redundant word must be followed by a blank interval of at least $E+1$ digit intervals, and the minimum word length N is $2E+1$. Such a system is capable of correcting error bursts of the type specified hereinabove if adjacent bursts are separated by at least $E+1$ blank intervals or $N-E$ correctly-received digits.

The encoding of an information word in accordance with the principles of the present invention involves the transfer of an $n$-digit information word to the $n$ bistable stages of a main shift register. Then, the digits of the information word are serially shifted to an information-carrying line and during this process two distinct sets of parity check digits are generated and suffixed to the information word. One set of parity check digits imposes only even parity relationships between the information digits and the check digits of both sets, whereas the other set of parity check digits etsablishes both even parity relationships and an even number of odd parity relationships between the information digits and the check digits of both sets.

The encoding of an information word in accordance with the principles of the present invention may be more clearly and completely understood from the following analysis. Let $$N=C\times L \qquad (1)$$

where N equals $n+r$ and C and L are relatively prime integers, with $C<L$. C and $L-1$ respectively specify the number of parity check digits included in the check groups to be suffixed to the information word during the encoding process. The error-correcting capabilities of a system embodying these principles is defined by $$E=\left[\frac{C+1}{2}\right] \qquad (2)$$

The C checks are determined by the following set of homogeneous equations:

$$\sum_{d=0}^{L-1} x_{i+dC}=0;\ \text{for } i=1\ldots C \qquad (3)$$

and the L checks are determined by the following set of inhomogeneous equations:

$$\sum_{h=0}^{C-1} x_{l+hL}=\begin{matrix}0;\ \text{for } l=1,2\ldots E-1\\ 1;\ \text{for } l=E, E+1\\ 0;\ \text{for } l=E+2\ldots L\end{matrix} \qquad (4)$$

Expressions 3 and 4 are uniquely solvable modulo N whenever an even number of odd parity checks is included in the two sets.

The rank of the system of Expressions 3 and 4 is $L+C-1$, i.e., all but one of the equations defined by Expressions 3 and 4 are independent. Since one is dependent on and completely determined by the formulation of the independent equations, only $L+C-1$ parity checks need actually be added to the information word, one parity group including C check digits and the other parity group including $L-1$ check digits.

To specifically illustrate the mode of operation of and the principles embodied in an illustrative encoder made in accordance with the present invention, assume that it is desired to encode 20-digit information words for transmission over a noisy channel which is subject to error bursts of length $\leq 3$. If C equals 5 and L equals 6, $N=C\times L=30$, and the number of parity check digits to be added to each 20-digit information word is $L+C-1$ or 10 digits, 5 of these being L checks and 5 being C checks. Furthermore, E is determined from Expression 2 to be equal to 3.

The two sets of encoding Equations 3 and 4 may, for the above assumed parameters, be respectively particularized as follows:

$$C_1\colon\ x_1+x_6+x_{11}+x_{16}+x_{21}+x_{26}=0$$
$$C_2\colon\ x_2+x_7+x_{12}+x_{17}+x_{22}+x_{27}=0$$
$$C_3\colon\ x_3+x_8+x_{13}+x_{18}+x_{23}+x_{28}=0$$
$$C_4\colon\ x_4+x_9+x_{14}+x_{19}+x_{24}+x_{29}=0$$
$$C_5\colon\ x_5+x_{10}+x_{15}+x_{20}+x_{25}+x_{30}=0 \quad (5)$$

$$L_1\colon\ x_1+x_7+x_{13}+x_{19}+x_{25}=0$$
$$L_2\colon\ x_2+x_8+x_{14}+x_{20}+x_{26}=0$$
$$L_3\colon\ x_3+x_9+x_{15}+x_{21}+x_{27}=1$$
$$L_4\colon\ x_4+x_{10}+x_{16}+x_{22}+x_{28}=1$$
$$L_5\colon\ x_5+x_{11}+x_{17}+x_{23}+x_{29}=0$$
$$L_6\colon\ x_6+x_{12}+x_{18}+x_{24}+x_{30}=0 \quad (6)$$

It is noted that in the assumed example information digits appear in digit positions $x_1$ through $x_{20}$ of the encoded redundant word, that the C checks appear in digit positions $x_{21}$ through $x_{25}$ thereof, and that the L checks appear in positions $x_{26}$ through $x_{30}$. For illustrative purposes, the check digit $L_1$ is assumed to be dependent. Hence, only the L check digits $L_2$ through $L_6$, in addition to the C check digits $C_1$ through $C_5$, are actually generated by the specific encoder to be described herein. An even number of the L checks, viz., $L_3$ and $L_4$, establish odd parity relationships between certain ones of the information and check digits, and the remainder of the L checks and all of the C checks establish even parity relationships between the information and check digits.

A specific illustrative 30-digit redundant word and its corresponding 30-digit synchronization word are shown in FIG. 2, each of the parity check digits in positions $x_{21}$ through $x_{30}$ of the redundant word having been formulated so as to satisfy one of the equations included in Expressions 5 and 6.

Figure 3:
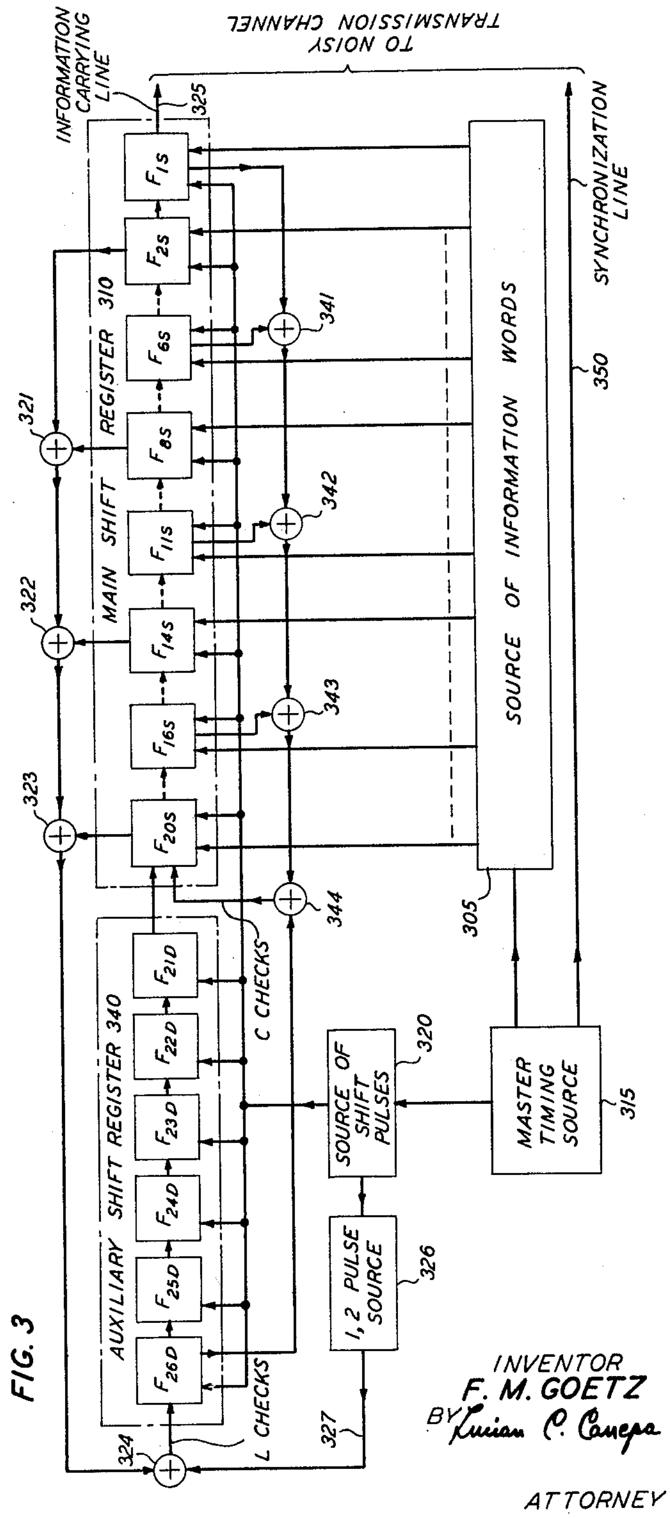
FIG. 3 depicts a specific illustrative encoder made in accordance with the principles of this invention.

Referring now to FIG. 3, there is shown a specific illustrative encoder made in accordance with the principles of the present invention. The depicted encoder is designed to convert 20-digit information words into 30-digit redundant words for transmission over a noisy channel which is subject to error bursts of the type specified above of length $\leqq 3$. The illustrative encoder includes a source 305 of information words which are to be coupled to the channel for transmission to a remote location. The source 305 is connected to the 20 bistable circuits $F_{1S}$, $F_{2S}$ . . . $F_{6S}$ . . . $F_{8S}$ . . . $F_{11S}$ . . . $F_{14S}$ . . . $F_{16S}$ . . . $F_{20S}$ of a main shift register 310 and supplies information words thereto under the control of a master timing circuit 315.

The information digits stored in the main shift register 310 of the illustrative encoder shown in FIG. 3 are shifted in a serial mode under control of a source 320 of shift pulses through the terminal output stage $F_{1S}$ of the register 310 to an information-carrying line 325. During the 10-digit interval in which the first 10 digits of the information word are being shifted to the line 325, parity check circuitry in the encoder generates and suffixes two distinct 5-digit check sequences to the 20-digit information word.

The parity check circuitry depicted in FIG. 3 comprises and L check generator which includes a first plurality of EXCLUSIVE-OR circuits 321, 322, 323, 324 and, in addition, a pulse source 326 which applies to output lead 327 a "1" signal in synchronism with each of the first and second shift pulse outputs of the source 320. Otherwise, the source 326 supplies "0" signals to the lead 327.

The EXCLUSIVE-OR circuit 321 of the L check generator shown in FIG. 3 receives as inputs thereto signals indicative of the states of the bistable circuits $F_{2S}$ and $F_{8S}$ of the main shift register 310 and applies its output to the EXCLUSIVE-OR circuit 322, the other input to the circuit 322 being the state of the bistable circuit $F_{14S}$. In turn, the output of the circuit 322 is applied to the EXCLUSIVE-OR circuit 323 whose other input is the state of the bistable circuit $F_{20S}$. Then, the output of the circuit 323 is applied to one input terminal of the EXCLUSIVE-OR circuit 324 whose other input terminal is connected to the output lead 327 of the pulse source 326. Lastly, the output signal of the circuit 324 is inserted into the input bistable circuit $F_{26D}$ of an auxiliary shift register 340. This output signal, which is the check digit $L_2$, is so inserted prior to the appearance of the first shift pulse at the output terminals of the source 320.

Subsequent to the generation and insertion of the check digit $L_2$ into the bistable circuit $F_{26D}$ of FIG. 3, there is applied from the source 320 to the shift registers 310 and 340 and to the pulse source 326 the first one of 30 regularly-spaced shift pulses. The first one of these shift pulses causes: (1) the information digit in position $x_1$, i.e., the information digit stored in the bistable circuit $F_{1S}$, to be transferred to the information-carrying line 325; (2) the check digit $C_1$ to be generated by a second plurality of EXCLUSIVE-OR circuits 341, 342, 343, 344 and to be inserted into the bistable circuit $F_{20S}$ of the register 310, and (3) the odd parity check digit $L_3$ to be inserted into the bistable circuit $F_{26D}$ of the auxiliary shift register 340. At the end of four more such shift pulses, the check digits $L_2$ through $L_6$ are stored in the bistable circuits $F_{21D}$ through $F_{26D}$, respectively, and the check digits $C_1$ through $C_5$ are stored in the bistable circuits $F_{16S}$ through $F_{20S}$, respectively Shifting of the registers 310 and 340 then continues for a total of 30 shift pulses until the 20-digit information word and its two 5-digit check suffixes have been serially transferred to the information-carrying line 325, after which the bistable circuits of the registers 310 and 340 are reset.

Encoding of the next information word can begin at any time after the last digit of the previous redundant word has been transferred to the information-carrying line 325. Actual transfer of the first digit of the next word to the line 325 must not, however, begin until at least $E+1$ or four digit intervals elapse after the transfer to the line 325 of the last digit of the previous word.

During each of the 30 digit positions in which information and check digits are being transferred from the terminal output stage $F_{1S}$ of the main shift register 310 to the information-carrying line 325, the master timing source 315 couples a "1" signal to a synchronization line 350. Thus, in each 30-digit word period, a redundant information word, consisting of "0's" and "1's," appears on the information-carrying line 325 and a synchronization word, consisting only of "1's" appears on the synchronization line 350.

That the parity check generators included in the illustrative encoder shown in FIG. 3 satisfy the various equations included in Expressions 5 and 6 may be easily verified by, for example, observing that the EXCLUSIVE-OR circuits 321, 322, 323, and 324 perform the modulo 2 sum of the digital output signal of the source 326 and the digits stored in the bistable circuits $F_{2S}$, $F_{8S}$, $F_{14S}$, and $F_{20S}$ of the register 310. Prior to the first shift pulse from the sourse 320, these bistable circuits have stored therein the digits appearing in positions $x_2$, $x_8$, $x_{14}$, and $x_{20}$, respectively, and the output of the source 326 is an "0" signal. The modulo 2 sum of these digital signals is applied to the bistable circuit $F_{26D}$ of the auxiliary shift register 340 and constitutes the digital signal which eventually ends up in digit position $x_{26}$. Thus, it is evident that the second one of the equations of Expression 6, viz., $x_2+x_8+x_{14}+x_{20}+x_{26}=0$, is satisfied by the described circuitry. In a similar manner, it can be easily shown that the equations in Expressions 5 and 6 which define the check digits $C_1$ through $C_5$ and $L_3$ through $L_6$ are satisfied by the specific illustrative encoder depicted in FIG. 3.

It is noted that the component circuits out of which the specific illustrative encoder depicted in FIG. 3 is formed are well known in the art and completely conventional, and are accordingly not depicted in detail in the drawing.

In summary, the specific illustrative encoder depicted in FIG. 3 modifies a 20-digit information word by suffixing thereto two 5-digit groups of parity check digits. One group of check digits, the L group, is generated by a first plurality of EXCLUSIVE-OR or modulo 2 adder circuits 321, 322, 323, 324 whose inputs are derived from spaced ones of the stages of the main shift register 310 and from the pulse source 326. The L digits are initially inserted into the stages of the auxiliary shift register 340 and comprise the second group of check digits to be suffixed to the information word. The L check digits establish both even parity and an even number of odd parity relationships between the information digits and the check digits of both groups.

The other group of check digits, the C group, is generated by a second plurality of EXCLUSIVE-OR or modulo 2 adder circuits 341, 243, 343, 344 whose inputs are derived from different spaced ones of the stages of the main shift register 310 and from the input bistable circuit $F_{26D}$ of the auxiliary shift register 340. The C digits are applied in sequence to the input bistable circuit $F_{20S}$ of the main shift register 310 so as to be directly suffixed to the information word. These check digits establish only even parity relationships between the information digits and the check digits of both groups.

Now, with respect to the decoding operation which is carried out by a system made in accordance with the principles of the present invention, there are set forth below (1) a general analysis of the decoding operation, (2) a specific description of the operations that are carried out by an illustrative decoder to correct the error types represented in FIGS. 1A and 1B, and (3) a detailed description of the specific illustrative decoder shown in FIGS. 4, 5, and 6.

All decoding operations are performed upon a continuous $m$-digit sequence $y$, where $|N-m|$ is $\leqq E$. It is assumed that whenever a continuous sequence of $\leqq N-E$ digits is not detected, due to the loss of $l$ interior digits, where $1\leqq l \leqq E$, "0's,' are substituted for the missing digits, thereby simulating a continuous sequence.

The first step in decoding is to determine whether or not a terminal error occurred. If a terminal error did not occur, the correcting procedure simply involves reconstruction of the erroneously-received interior digits. If, however, a terminal error is detected, the correcting procedure involves selection of a group of L checks that involve only correctly-received digits. The resulting "1's" in the L check sequence can then be employed to properly locate or synchronize the information word. Then, any erroneously-received digits in the information word can be reconstructed.

Since checks performed by the decoder might involve gained digits, it is necessary to characterize such digits as to position and value. To do this, each transmitted N-digit sequence $x_1 \ldots x_N$ can be considered as a subsequence of $x_{1-E} \ldots x_{N+E}$, where the values of the 2E additional digits are determined by:

$$x_i + x_{i+N} = 0;\ i = 1-E,\ 2-0 \ldots E \quad (7)$$

Then, every $m$-digit sequence $y$ corresponds to a subsequence of this $N+2E$-digit sequence, differing therefrom in at most E digit positions. Any received digit $y_i$ which has the same value as the corresponding digit in the major sequence will be called "correct," even if it is a gained digit.

The equations which are embodied in an illustrative decoder made in accordance with the principles of this invention derive a sequence $C_k$ of C check digits and a sequence $L_k$ of L checks, which are defined as follows:

$$C_k = \sum_{g=0}^{L-1} y_{k+gC};\ k = 1, 2 \ldots C-N+m, \quad (8)$$

$$L_k = \sum_{f=0}^{C-1} y_{k+fL} + d_k;\ j = 1, 2 \ldots L-N+m \quad (9)$$

where the $d_k$ are binary coefficients defined for the particular checks being made. In the first set of checks made by the decoder (which are used to determine whether or not a terminal burst occurred) these coefficients are expressed by:

$$d_k = \begin{bmatrix} 1;\ k = E,\ E+1 \\ 0;\ \text{otherwise} \end{bmatrix} \quad (10)$$

If it is found that a terminal burst has not occurred, then any errors in the information word can be corrected by the following procedure. Notice first that Equations 8 and 9 for each value of $k$, have $y_k$ as the only variable included in both $C_k$ and $L_k$. The correcting procedure involves applying these equations sequentially to each of the $m(=N)$ received digits; i.e., $k=1, 2 \ldots N$. It can be proven that a unique sequence of checks exists, of length $\geqq C-E$ digits, throughout which $C_k = L_k = 0$. Following this sequence the first digit in error causes both $L_k$ and $C_k$ to equal 1. For this value of $k$, the digit $y_k$ can be corrected by changing its value. Likewise, each succeeding check which causes both $L_k$ and $C_k$ to equal 1 indicates that the particular received digit, $y_k$, which is common to each check is in error. Hence correction of this digit can be accomplished by reversing its binary value.

On the other hand, once it has been determined that a terminal error has occurred, the L checks defined by (9) are made with all $d_k=0$. The fact that error correction is possible follows directly from the three theorems set out hereinbelow. The theorems establish that: (1) the presence of a terminal error can always be detected, (2) a sequence of L checks can be found that involve only correct digits, (3) the information word can be unambiguously positioned with respect to the received digits, and (4) any lost or incorrect information digits can be reconstructed.

*Definitions.*—Let $G$=the number of gained digits in a received $m$-digit sequence, and let $H$=the number of lost digits in the transmitted N-digit sequence. Let N(L) and N(C) be the number of "1's" derived from the checks described by Equations 9 and 8, respectively, using the constant of 10.

*Theorem I.*—A necessary and sufficient condition for a message to be received without a terminal error is that $m=N$ and $N(L)=N(C)$.

*Proof*: (i) *Necessity.*—If $m \neq N$ a digit must have been gained or lost. If $N(L) \neq N(C)$ an interior error burst could not have caused the errors, since each error in an interior burst causes exactly one L check and one C check to fail.

(ii) *Sufficiency.*—Assume $m=N$ and that a terminal error occurred. It will be seen that $N(L) \neq N(C)$. Since $m=N$, $G=H\geqq 1$. Notice that C checks made on gained digits are equal to "0" if the value of the gained digit is equal to the value of the corresponding lost digit. For example, if $x_1$ is received as $y_j$, the $C_j$ is calculated by:

$$C_j = x_1 + x_{1+C} + x_{1+2C} + \ldots + x_{1+N-C} \quad (11)$$

But if $x_1$ is lost, the corresponding check, $C_k$, will be made later in the sequence as follows:

$$C_k = x_{1+C} + x_{1+2C} + \ldots + x_{1+N-C} + x_{1+N} \quad (12)$$

This justifies calling the gained digit $x_{1+N}$ correct if it equals $x_1$ as defined by (7). All digits other than $x_1$ and $x_{1+N}$ in (11) and (12) are interior digits and cannot be affected by a terminal burst of length $\leqq E$. Therefore, N(C) is equal to the number of incorrect digits. It remains to be shown that $N(L) > N(C)$.

To calculate N(L) it is convenient to separate the L checks into three groups. Group 1 includes those checks which involve only transmitted digits $x_z$ for $E \leqq z \leqq N-L+E+1$; group 2 includes all checks not included in group 1 which involve only received digits $y_z$ for the same range of $z$; and group 3 comprises the remaining locator checks. Observe that $L \geqq 2E$, since $L \geqq C+1 \geqq 2E$. None of the digits involved in the group 1 checks can have changed in value because both the first and last digits $x_z$ in this group are at a distance of $\geqq E$ digits from the ends of the transmitted N-digit sequence, since $$N-(N-L+E+1)+1=L-E\geqq E \quad (13)$$

and if an error burst of length E occurred at one end of the sequence, $G=H\geqq 1$ implies that the total error exceeds E. It follows that all the digits in group 2 are also correct. All incorrect digits involve group 3 checks.

A shift in the received sequence relative to the transmitted sequence implies that the encoded odd parity digits of group 1 do not entirely coincide with the decoder odd parity checks of group 2. As a result, at least one check fails in each of these groups. Group 3 includes only even parity checks, and the number of failures in this group equals the total number of incorrect digits. Therefore, since the groups are mutually exclusive and include all the checks, $N(L)\geqq N(Q)+2$.

*Theorem II.*—A sequence of at least $L-E$ consecutive locator checks can always be derived from an $m$-digit sequence in which a terminal error occurred, such that the checks are made only on correct digits.

*Proof.*—At least $C-E$ consecutive corrector checks must be correct. Assume $C_k=0$ for $k=a, a+1 \ldots a+C-C-1$. This implies that all the end digits involved in these checks are correct, i.e., $y_i$ are correct for $a\leqq i\leqq a+C-E-1$ and for $a+N-C\leqq i\leqq a+N-E-1$. But, since a terminal error is assumed, all the digits interior to these groups must also be correct. Therefore $y_i$ are correct for $a\leqq i\leqq a+N-E-1$. This implies that all L checks derived from these digits must be correct. Therefore, $l_j$ are correct for $a\leqq j\leqq (a+N-E-1)-(N-L)$ or for $a\leqq j\leqq a+L-E-1$, which defines the sequence of $L-E$ consecutive locator checks.

Now, consider locator check sequences of length $\geqq L-E$ digits which are derived from only correct digits. The restriction that all the digits be correct defines the major sequence from which all such subsequences are obtained. This major sequence has $L+2E$ digits and is constructed by adding E digits in cyclic fashion to each end of the encoded locator sequence defined by Equations 6, as follows:

$L=2E$: Sequence: $(1, 0 \ldots 0, 1, 1, 0 \ldots 0, 1)$
Position: $(1, 2 \ldots L-1, L, L+1, L+2 \ldots 2L-1, 2L)$ $L>2E$: Sequence: $(0, 0 \ldots 0, 1, 1, 0 \ldots 0, 1)$ (14)
Position: $(1, 2 \ldots L-1, L, L+1, L+2 \ldots 2L-1, 2L)$ With the aid of these sequences the following theorem, which establishes a technique for locating the information digits within a received $m$-digit sequence, can be proven.

*Theorem III.*—If a locator sequence of $\geqq L-E$ correct check digits is derived sequentially, at most $L+1$ digits are required to unambiguously locate the information digits.

*Proof.*—If the two adjacent "1's" in the locator sequence are received, they will be within the first $L+1$ digits detected. These adjacent "1's" indicate the positions of the digits in positions $x_E$ and $x_{E+1}$. There are only two cases where this pair of "1's" will not be received, viz., where either the first or last E transmitted digits are lost. These cases are distinguishable by the fact that only $L-E$ digits and only one "1" are received. If the first E digits are lost the isolated "1" indicates the location of the digit in position $x_{E+1}$, otherwise this "1" locates the digit in position $x_E$.

Once the information sequence has been located, the final stage of correcting a terminal error may be accomplished. This stage involves reconstructing any information digits that have been received in error. Assume that only the information digits located at the initial part of the transmitted sequence require correcting. All interior digits from $x_{E+1}$ to $x_{N-E}$ must be correct if only a terminal error occurred. Equations 5 can be modified by adding $x_1$ to both sides so that $$x_i=\sum_{d=1}^{L-1} x_{i+dC}=0;\ \text{for } i=1 \ldots E \quad (15)$$

If the digit in position $x_E$ must be calculated, the digit in position $x_{N-E+1}$ cannot be simultaneously in error. Otherwise, the correct value of each digit on the right-hand side of the left-hand one of Equations 15 is known, and the last step in deciphering an error which is within the error-correcting capabilities of the system described herein has been demonstrated.

As stated hereinabove, the correcting procedure carried out by the decoder of a system made in accordance with the principles of this invention has three basic aspects: (1) it must be determined whether a terminal or interior error has occurred, this determination being made during Phase 1 of the cycle of operation of the illustrative decoder; (2) if a terminal burst is indicated, the position within the sequence of either the digit in position $x_3$ or $x_4$ must be located, this being accomplished during Phase 2; (3) in either event, the first 20 transmitted digits must be shifted (with their correct values) into a set of bistable circuits during Phase 3.

The first of these functions is performed by noting whether the sequence received by the decoder has more or less than 30 consecutive digits or, in the case when exactly 30 consecutive digits are received, whether the number of L parity failures differs from the number of C parity failures. An affirmative answer indicates a terminal error. If a sequence of 30 digits interrupted by a loss of less than 4 digits is received or if in a consecutive sequence of exactly 30 digits the number of L failures equals the number of C failures (but is at least one), then an interior error burst occurred. Otherwise, unless an error outside the error-correcting capabilities of the illustrative system took place, exactly 30 digits are received consecutively, there are no L or C failures in the 10 parity checks that are made by the decoding circuitry, and, hence, the information word is correct as received.

The second function is performed by locating the first valid odd parity check in the received sequence. This is usually, but not always, the time in which the digit in position $x_3$ is involved in the check. To see this more clearly, there are outlined below, for the various cases represented in FIGS. 1A and 1B, the Phase 2 decoding principles:

(1) If 27 consecutive digits are received, note that:

(*a*) The digit in position $x_3$ might have been lost (Case 4 in FIG. 1A);

(*b*) Only two valid combined L and C checks can be made, since C checks extend over 26 digits (e.g., $x_1+x_{26}$, $x_2+x_{27}$).

Since in this group it is assumed that all 27 received digits have their correct values, however, only two checks are required. Hence, If $(L_1, L_2)=(0, 0)$, we have Case 1, in which the digit in position $x_2$ was the last one checked;

If $(L_1, L_2)=(0, 1)$, we have Case 2, in which the digit in position $x_3$ was the last one checked;

If $(L_1, L_2)=(1, 1)$, we have Case 3, in which the digit in position $x_4$ was the last one checked; and If $(L_1, L_2)=(1, 0)$, we have Case 4, in which the digit in position $x_5$ was the last one checked.

(2) If 28 or 29 consecutive digits are received, note that:

(*a*) If on either the first and/or second C check a "1" is obtained, this indicates the corresponding first and/or second digit is in error, since all other digits involved in the check are correct. Hence, valid L checks can be made in the first two places by adding to them (modulo 2) the results of the C check. If a "1" is obtained on such a valid L check, this part of the operation will have been completed since the last checked digit will have been the one in digit position $x_3$;

(b) If a "1" is not obtained in the first two C checks, then the sequence is shifted forward and L checks are made until a "1" (indicating the location of the digit in position $x_3$) is found. Note that after the second check no correction by a C check value is required, since the digits in positions $x_3$ through $x_{27}$ (which include all that are required for the first odd L check) are correct.

(3) If 30 consecutive digits are received, then L and C checks are made as the information digit sequence is shifted forward five times, with a "1" signal being added to the third and fourth L checks.

If the number of L failures equals the number of C failures, then no shift occurred between the synchronization and information words. Otherwise (Cases 1, 2, 7 and 8 in FIG. 1A), it can be seen that the digit in position $x_3$ can be located exactly as in the previous Case 2 above.

(4) If more than 30 consecutive digits are received, the same procedure as that outlined above for 28 or 29 digits can be used, with a single exception. This is Case 1, wherein 33 digits are received. In this case the first L check will, when the C check value is added to it, be equal to "1" but, obviously, will not represent the position of the digit in position $x_3$. To eliminate this possibility, the first received digit is ignored in all these cases (i.e., if 31, 32, or 33 consecutve digits are received) and then the digit in position $x_3$ is located as in the case for 28 received digits.

The final phase of error correction is to back shift the information sequence a known number of times while placing the correct value of each information digit at the beginning of the sequence. In this connection, consider the two types of errors separately:

(1) For interior bursts, the number of back shifts is 30, i.e., the entire sequence is recirculated. The start of an error burst is located by a simultaneous failure of both L and C checks following a sequence of at least two successive "0's" from both check circuits. From that point on, simultaneous L and C failures cause a reversal of the digit when it is transferred from the end of the sequence to the beginning.

(2) For terminal bursts, the number of back shifts is usually 3 (when the digit in position $x_3$ was the last digit shifted in Phase 2). In this case, the new values inserted at the beginning of the sequence are such that L equals 1 for the first digit added ($x_3$) and L equals 0 for the remaining two.

For the special terminal error in which only 27 digits are received, anywhere from 2 to 5 back shifts are required. Here again the L checks are used for determining the correct value of the inserted digit, with L equal to 1 for each of the digits in positions $x_3$ and $x_4$ and L equal to 0 otherwise.

Figures 4, 7:
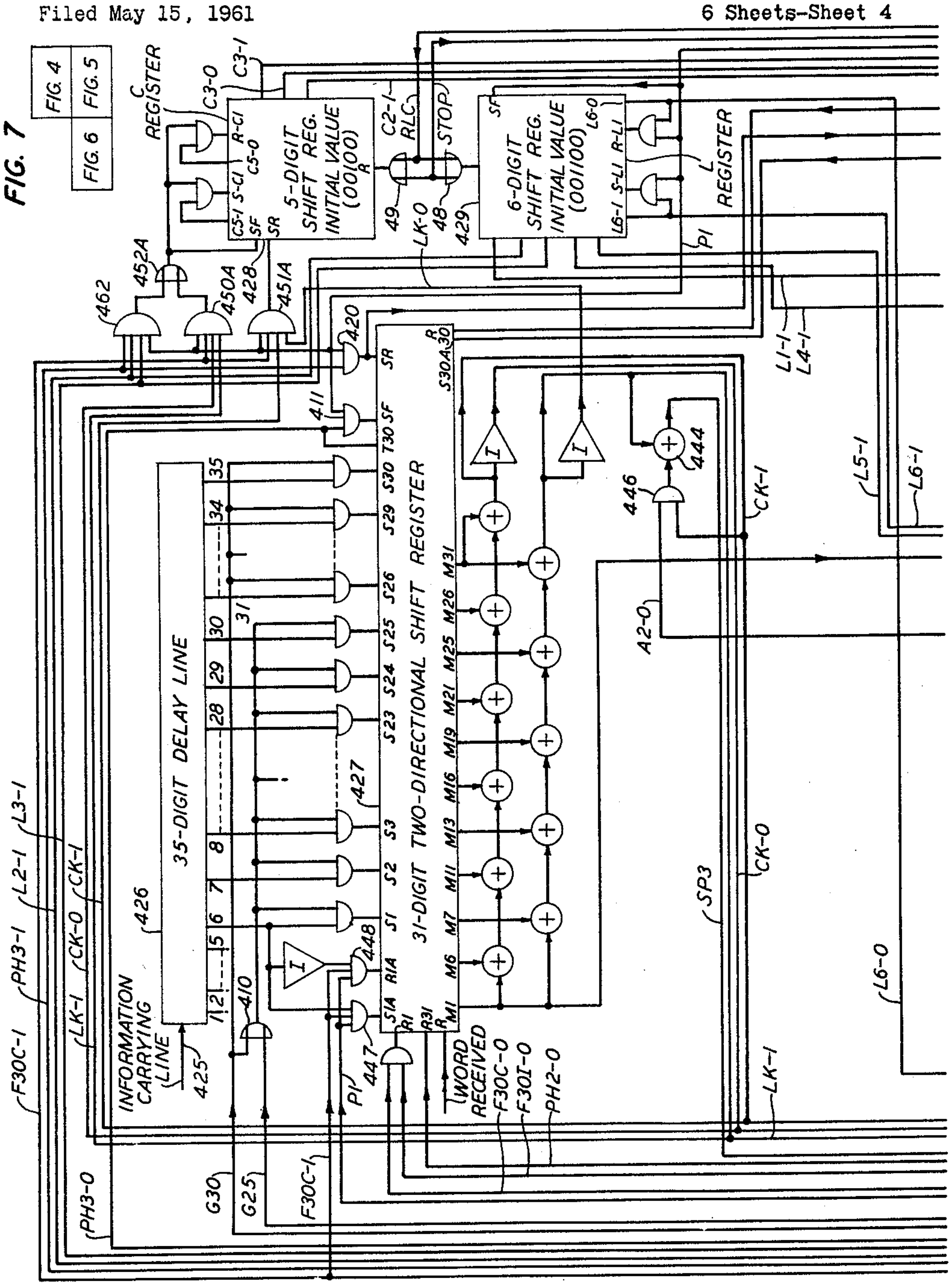
FIGS. 4, 5 and 6 considered together show a specific illustrative decoder made in accordance with the principles of the present invention.
Figure 5:
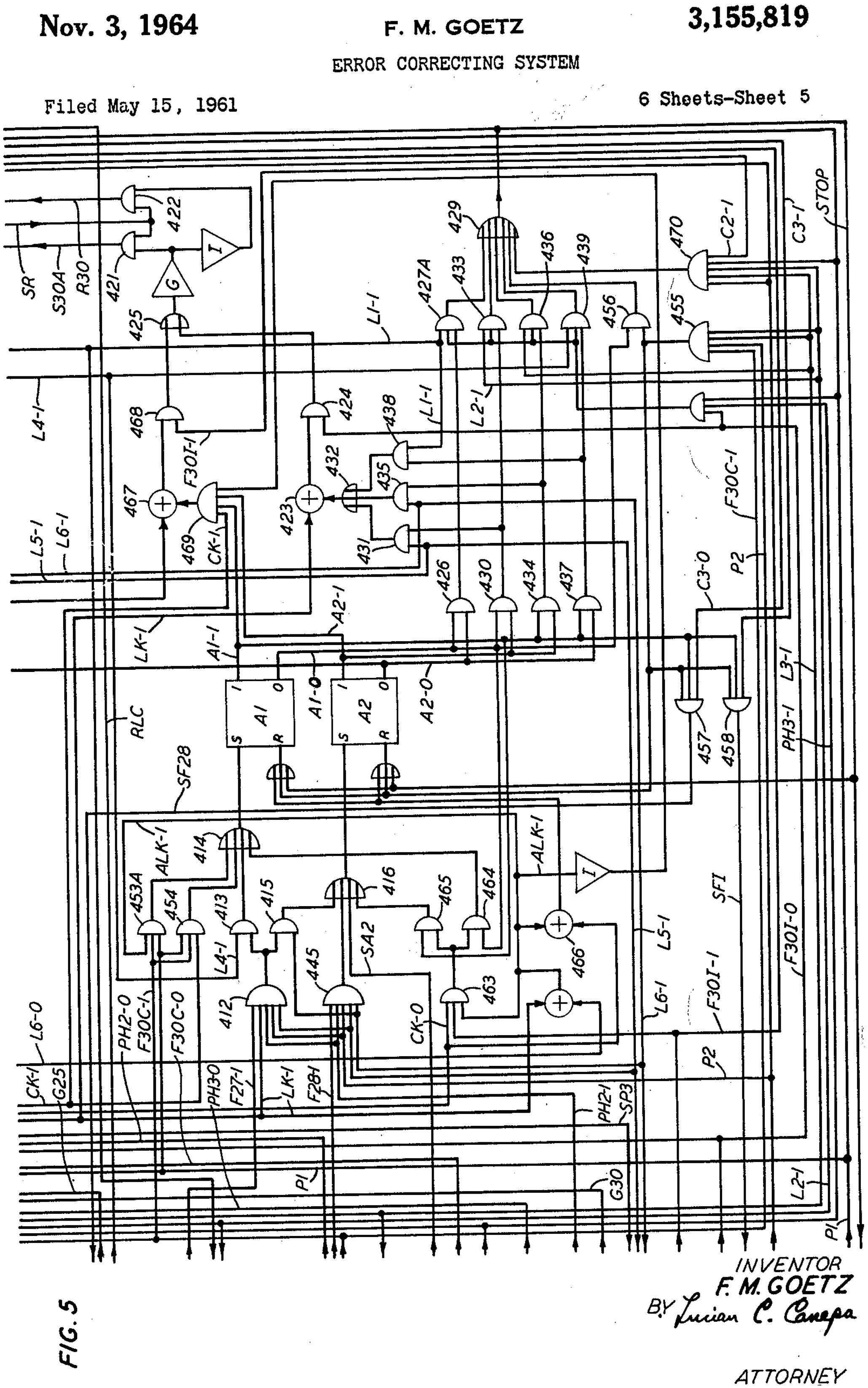
Figure 6:
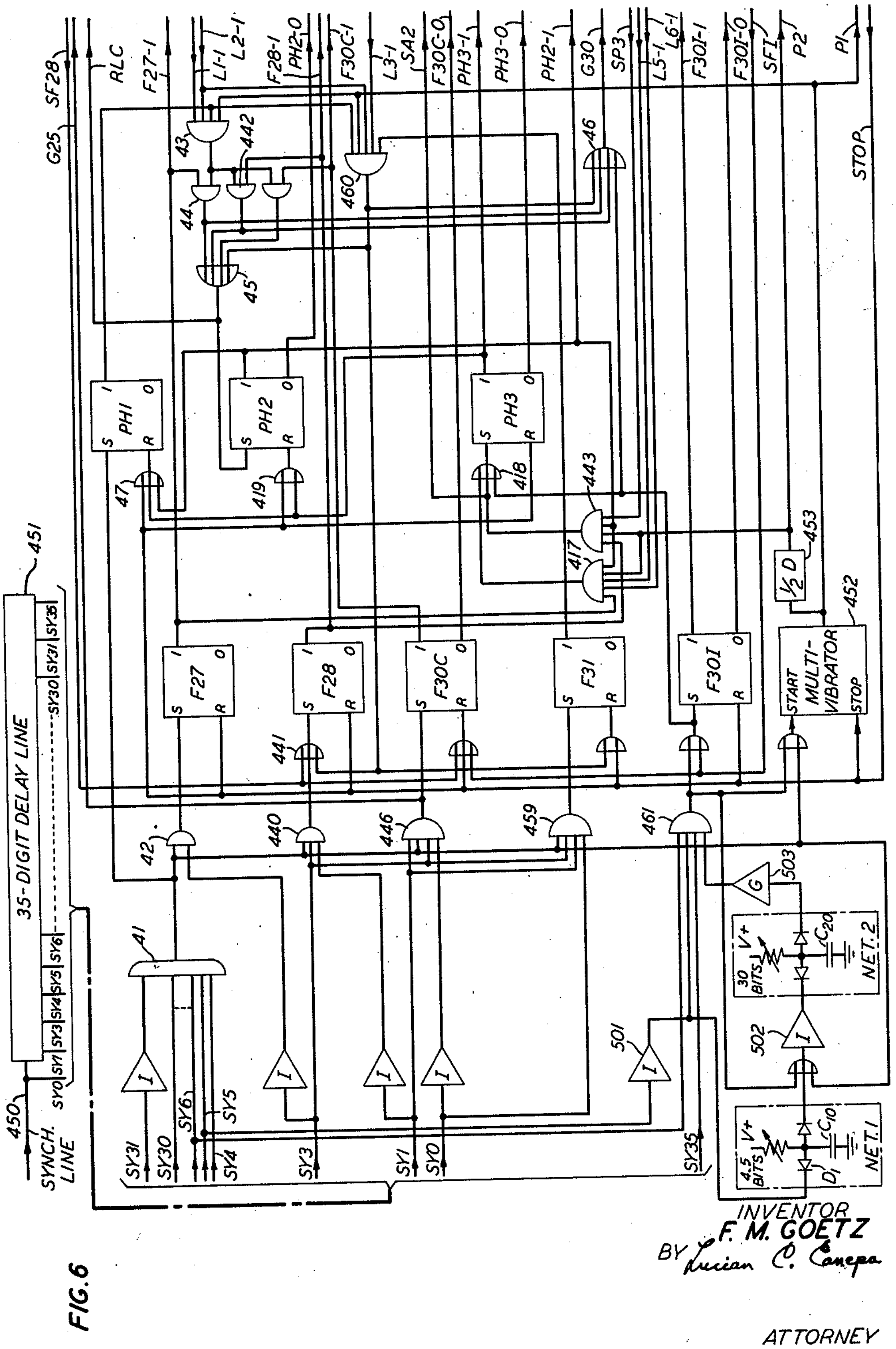

The inputs to the specific illustrative decoder shown in FIGS. 4 through 6 are coupled thereto via two lines; one, the synchronization line 450 (FIG. 6), which carries a positive pulse or "1" signal for each received digit and the other, the information-carrying line 425 (FIG. 4), which carries a positive pulse for each received digit having the value "1." Each of these lines feeds into an N—C- or 35-digit delay line, the synchronization line 450 being coupled to a delay line 451 and the information-carrying line 425 being coupled to a delay line 426. Circuit action for decoding a redundant information word begins when the conditions are met which satisfy one of the types of correctable errors. The corresponding mode bistable circuit in the decoder is then set. There are five such types and, hence, for each correctable received word, one, and only one, of the five bistable circuits F27, F28, F30C, F31, and F30I (FIG. 6) is set. The conditions of pulses and absence of pulses at the synchronization line 450 necessary to set each of these will be described hereinbelow. Here it suffices to mention the type of received code symbol represented by each mode bistable circuit:

F27: exactly 27 consecutive digits,
F28: 28 or 29 consecutive digits,
F30C: exactly 30 consecutive digits,
F31: 31 or more consecutive digits,
F30I: a sequence of 30 digits interrupted by the loss of from 1 to 3 digits.

When any of these mode bistable circuits is set, a multivibrator 452 (FIG. 6) is started, and this produces output pulses $P_1$ in synchronism with the synchronization pulses, i.e., the $n$th $P_1$ pulse appears $n$ digit intervals after starting the multivibrator. Besides clocking many logical operations in the decoder, each $P_1$ pulse is passed to a ½-digit delay line 453, the output signal of which is termed $P_2$.

Depending upon which mode bistable circuit was set, one of three phase bistable circuits PH1, PH2, and PH3 (FIG. 6) is set. As will be made clear subsequently:

The circuit PH1 represents the sequence of operations forward shifts) necessary to properly position the received information word in an $N+1$ or 31-digit main shift register 427 (FIG. 4);

The circuit PH2 represents the sequence of forward shifts necessary to locate the position of a known or reference digit, such as the digit in position $x_3$, within the received information word; and The circuit PH3 represents the sequence of back shifts necessary to locate the correct information word in 20 stages of the main shift register 427.

Not every phase is required on every type of error, but, where three phases are required, they advance in sequence in accordance with their numerical ordering. If no error occurred, the correct information word is available in the register 427 after Phase 1; otherwise the sequence is completed after Phase 3 (but, as explained below, Phases 1 and 2 are sometimes omitted).

Information is gated from the information delay line 426 into a portion of the $N+1$ or 31-digit two-directional main shift register 427 in a parallel block of either 25 or 30 digits under control of leads G25 and G30, respectively. Such a gating pulse is provided only once per received word and results in setting the word in the information delay line 426 into the bistable circuits M1 through M25 or M1 through M30 of the register 427, with lost digits being transferred into the register 427 as "0's."

Connected to the output of the register 427 are two series arrangements of EXCLUSIVE-OR circuits, one for generating L checks and the other for generating C checks. When the register 427 is shifted forward (which occurs on each $P_1$ pulse during Phase 1 or 2) and when the register 427 is back-shifted (which occurs on each $P_1$ pulse during Phase 3) either bistable circuit M1 or bistable circuit M31 of the register 427 is reset, so that its value does not contribute to the L and C checks.

Two other shift registers are provided in the decoder: a C- or 5-digit register 428 (FIG. 4) and an L- or 6-digit register 429 (FIG. 4). These two registers are identical in arrangement to the main shift register 427, with one exception, viz., the R or reset lead of each of the registers 428 and 429 is connected to the set lead (rather than the reset lead) on one or two of the bistable circuits thereof. Hence, pulsing the reset lead of each of the registers 428 and 429 restores each of these registers to its initial value, viz., a digital representation in which the bistable stages $C_1$ through $C_5$ of the register 428 respectively indicate 0, 0, 1, 0, 0 and in which the bistable stages $L_1$ through $L_6$ of the register 429 respectively indicate 0, 0, 1, 1, 0, 0.

Auxiliary bistable circuits $A_1$ and $A_2$ (FIG. 5) are included in the novel decoder to temporarily store the results of some of the parity checks made during the decoding operation.

With this introduction to the major equipment units of the decoder shown in FIGS. 4 through 6, the sequence of operation for each correctable error type will now be described in detail.

A. *27 Consecutively-Received Digits*

A pulse or "1" signal appearing at the output of each of AND circuits 41 and 42 (FIG. 6) indicates that a consecutive sequence of 27 "1's" flanked by "0's" at taps 31 and 3 has been detected by the tapped synchronization delay line 451. This pulse sets the bistable circuits F27 and PH1 and starts the multivibrator 452. Phase 1 of the cycle of operation involves waiting for five digit intervals so that the consecutive sequence of digits starts at tap No. 35 of the delay line 451. Since the L register 429 is shifted forward with each $P_1$ pulse, the fifth pulse in Phase 1 will appear at the output of AND circuit 43. This pulse passes through AND circuit 44 and OR circuits 45 and 46, resulting in:

(1) The setting of the bistable circuit PH2 (and consequently the resetting of the bistable circuit PH1 through OR circuit 47),
(2) The resetting of both of the L and C registers through OR circuits 48 and 49, and
(3) The parallel gating of 30 digits into stages M1 through M30 of the 31-digit two-directional shift register 427. (Note, however, that only those digits from stages M4 through M30 are actually used.)

Phase 2 lasts for just two $P_1$ pulses, which through AND circuit 411 shift the information sequence forward (i.e., to the right) in the register 427. On the $P_2$ pulse following the first shift, an L check is made, and, if the result is "1," a pulse passes through AND circuits 412, 413 and OR circuit 414 to set the bistable circuit $A_1$. Otherwise the bistable circuit $A_1$ remains reset. Similarly, the L check made after the second shift is passed to the bistable circuit $A_2$ through AND circuits 412, 415 and OR circuit 416. This second $P_2$ pulse also passes through AND circuit 417 and OR circuit 418, thereby setting the bistable circuit PH3 and terminating Phase 2 by applying a pulse via OR circuit 419 to the reset terminal of the bistable circuit PH2.

In Phase 3, the two-directional shift register 427 is reverse-shifted through AND circuit 420, and the correct value to be inserted into the stage M30 thereof is obtained each time from AND circuits 421 and 422. The number of shifts required during this phase, as well as the proper positioning of odd parity L checks, is determined by the states of the bistable circuits $A_1$ and $A_2$, as follows:

(1) If $(A_1, A_2)=(0, 0)$: Two reverse shifts are required, and no odd parity digits need be added to the L checks at EXCLUSIVE-OR circuit 423. Note that if $L_k$ equals 1, a "1" signal is applied via AND circuit 424 and OR circuit 425A to reset the stage M30 of the register 427. Since the value of $L_k$ was determined just prior to shifting, with the stage M31 in its "0" state (the stage M31 having been reset by a "1" signal from the bistable circuit PH2), this action has the effect of inserting the digits in positions $x_2$ and $x_1$ in such a way that L checks involving them have the value "0." On the second $P_1$ pulse, AND circuits 426A and 428A gate a "1" signal through AND circuit 427A, thereby producing a STOP pulse at the output of AND circuit 429A. This STOP pulse resets all bistable circuits except those in the register 427, stops the multivibrator, and is used to signal the external circuitry that a correct (decoded) message is stored in the stages M11 through M30 of the register 427. After the word is received by the external circuitry, there is provided a reset pulse from a source (not shown) to reset the register 427 in preparation for the receipt of the next redundant information word from the channel.

(2) If $(A_1,A_2)=(0, 1)$: Three reverse shifts of the register 427 are required, and on the first shift a "1" is applied to the EXCLUSIVE-OR circuit 423 via AND circuits 430 and 431 and OR circuit 432 to form an odd parity digit. In this case the STOP pulse to the multivibrator 452 passes through AND circuit 433 and OR circuit 429A.

(3) If $(A_1, A_2)=(1, 1)$: Four reverse shifts are required and odd parity is generated on the first two L checks by AND circuits 434 and 435 for the insertion into the register 427 of the information digits in positions $x_4$ and $x_3$. In this case the STOP pulse passes through AND circuit 436 and the OR circuit 429A.

(4) If $(A_1,A_2)=(1, 0)$: Five reverse shifts of the two-directional shift register 427 are required, with odd parity digits being generated on the second and third shifts. For this case the circuits involved are AND circuits 437, 438, and 439.

This concludes the circuit operation for the case in which three end digits are lost in transmission.

B. *28 or 29 Consecutively-Received Digits*

If more than 27 but less than 30 digits are received, a consecutive sequence of 28 or 29 digits, starting at tap No. 30 of the synchronization delay line 451, is indicated by a pulse at the output of each of the AND circuits 41, 440 and at the output of OR circuit 441. This pulse sets the bistable circuit F28, starts the multivibrator 452 and, as in the previous case, initiates Phase 1, which involves a 5 digit delay. The initiation of PH2 is exactly like that described above for the previous case except that the fifth pulse passes through AND circuit 442 rather than through the AND circuit 44. Resetting of the L and C registers 428, 429 and 30-digit gating into the register 427 are carried out over the same leads as in the previous case.

Phase 2 lasts until the information digit in position $x_3$ is shifted into the stage M31 of the register 427, which will take from one to four $P_1$ pulses. The bistable circuit PH2 is reset, thereby ending Phase 2, as a result of the bistable circuit PH3 being set by a pulse or "1" signal appearing at the output of AND circuit 443, due, in turn, to the gating action of a "1" signal on the lead marked SP3 (FIG. 4). Note that valid L checks appear on the lead SP3, i.e., if the digit stored in the stage M31 of the register 427 is in error it is inverted by the $C_k$ equals 1 signal applied to the EXCLUSIVE-OR circuit 444. However, since at most the first digits can be in error (at least one digit is lost), the bistable circuit $A_2$ is set (through AND circuit 445 and OR circuit 416) after the second shift and, due to the action of AND circuit 446, the C check is ignored from then on.

When the bistable circuit PH3 is set, the pulse on lead SA2 (i.e., the output lead from the AND circuit 443) ensures that the bistable circuit $A_2$ is set in case only one shift was required during Phase 2. From this point on the operation (and circuitry) are identical to those described above for Phase 3 in Case A for $(A_1,A_2)=(0, 1)$.

C. *30 Consecutively-Received Digits*

A pulse at the output of AND circuit 446 (FIG. 6) indicates that a "1" signal is present at each of taps 1 through 30 of the synchronization delay line 451 but that there is a "0" signal at the input (position No. 0) to the line 451 and a "0" signal at tap No. 31 thereof. This pulse starts the multivibrator 452, sets the bistable circuits F30C and PH1, and gates the first 25 of the information digits into the stages M1 through M25 of the two-directional shift register 427. As in Cases A and B above, Phase 1 lasts for exactly 5 digit intervals. However, this time, since information digits are already present in register 427, forward shifting takes place and 5 L and C checks are made. Also tap No. 6 of the delay line 451 is sampled each time a shift takes place and the new value appearing there is inserted into the stage M1 of the register 427 through AND circuits 447 and 448. During this phase the adjusted L check obtained from EXCLUSIVE-OR circuit 449 is used, i.e., "1's" are added in the third and fourth checks to account for the odd parity relationships embodied therein. Whenever the adjusted L check (ALK) has the same value as the C check (CK), the C register 428 is unaffected. However, if $ALK>CK$ the C register 428 is shifted forward through AND circuit 450A and OR circuit 452A, and if $ALK<CK$ the register 428 is reverse-shifted through AND circuit 451A, and for either inequality the bistable circuit $A_1$ is set via AND circuit 453A or AND circuit 454, respectively.

After the fifth shift has taken place in Phase 1, a $P_2$ pulse appears at the output of AND circuit 455 (FIG. 5). If no error took place, the bistable circuit $A_1$ is reset and a STOP pulse appears at the output of AND circuit 456. If the circuit $A_1$ is set but the stage $C_3$ is reset, this indicates a terminal error has occurred $[N(L)\neq N(C)]$, and the mode bistable circuit F30C is reset and the circuit F28 is set by a pulse at the output of AND circuit 457. Also, the bistable circuits $A_1$ and $A_2$ are reset, and the sequence is continued as previously described above for Phase 2 of the case wherein the mode bistable circuit F28 was set.

If after the fifth shift, both the circuit $A_1$ and the stage $C_3$ are set, a pulse appears at the output of AND circuit 458 to change the mode representation to that in which the bistable circuit F30I is set. Here again the bistable circuits $A_1$ and $A_2$ are reset, but the phase jumps to No. 3 and the sequence is then identical to that which is described above for the mode circuit F30I being set, except that the gating of 30 digits from the delay line 426 is not repeated since the register 427 is already loaded.

D. *31 or More Consecutively-Received Digits*

The sequence begins with a pulse at the output of AND circuit 459 (FIG. 6), which indicates that digits are present at taps 0 through 30 of the synchronization delay line 451 but that a blank or "0" signal is present at tap No. 31. As before, the multivibrator 452 is started and the bistable circuit PH1 is set, but this time a delay of six rather than five digit intervals ensues. This eliminates the first digit of the sequence, for the reasons explained above. The sixth $P_1$ pulse appears at the output of AND circuit 460 and, besides setting the circuit PH2, resetting the L and C registers, and gating the 2nd through the 31st digits into the stages M1 through M30 of the register 427, sets the mode bistable circuit F28. The remaining sequence is then as discussed in B above.

E. *30 Digits Interrupted by from 1 to 3 Consecutive Lost Digits*

Capacitor $C_{10}$ of network No. 1 (FIG. 6) is in the charging state whenever the input diode $D_1$ is reverse-biased, i.e., whenever no pulse appears at tap No. 5 of the synchronization delay line 451. At the occurrence of a pulse at that tap, the associated inverter 501 causes the capacitor $C_{10}$ to discharge. The resistance in network No. 1 is adjusted so that it takes 4.5 digit intervals for the capacitor charge to reach the threshold voltage of inverter 502 which is connected to the output of network No. 1. (Note that 4.5 was chosen in view of the fact that the minimum distance between digits of two successive words is 5 digit intervals, while the occurrence of the maximum correctable error would cause a separation of 4 digit intervals between successive digits in a word.) Therefore, the inverter 502 driven by network No. 1 should have a "0" output only when the blank interval between words is detected at taps 5, 6, 7, and 8 of the synchronization delay line 451.

Network No. 2 shown in FIG. 6 works in an analogous manner, but the timing thereof is adjusted for 28-digit intervals. (28 was chosen as a centered value between 26, the time when a 4-digit blank interval first arrives at tap No. 35, and 30, the time when a 4-digit blank interval is ready to leave tap No. 35.) Thus, it is seen that gate amplifier 505 following network No. 2 should have the value "1" applied thereto only after a delay of at least 28 digits from both the last detection of a word and the detection of an inter-word blank interval. Note that the consecutive sequences of digits are always detected first (if they exist) because the detecting gates therefor (AND circuit 41, and so forth) are situated at earlier taps on the delay line 451.

A pulse at the output of AND circuit 461 (FIG. 6) indicates that a 30-digit word (which does not have a sequence of at least 27 consecutive digits) has been detected. This pulse starts the multivibrator 452, sets the bistable circuits F30I and PH3, and gates 30 information digits into the stages M1 through M30 of the register 427. In this case the register 427 is back-shifted exactly 30 times. To count to 30, the C register 428 is shifted forward for each full cycle of the L register 429 by means of AND circuit 462. (Note that both of the L and C registers are wired to recirculate their contents, i.e., the output stage $L_6$ of the register 429 is connected to the input stage $L_1$ thereof and the output stage $C_5$ of the register 428 is connected to the input stage $C_1$ thereof.)

In this mode, the adjusted L check is employed at AND circuit 463. Note that the bistable circuits $A_1$ and $A_2$ are used to count successive events when each of the L and C checks has the value "0." The first simultaneously correct check sets the circuit $A_1$ through AND circuit 464, and the second sets the circuit $A_2$ through AND circuit 465. When one check fails and the other is correct, both of the circuits $A_1$ and $A_2$ are reset through EXCLUSIVE-OR circuit 466. Until the start of the burst is located, the binary value stored in the stage M1 is shifted into the stage M30 (through EXCLUSIVE-OR circuit 467 and AND circuit 468) for each back shift. However, if on any back shift both L and C checks fail and both of the circuits $A_1$ and $A_2$ are set, then the value stored in the stage M1 is reversed (by AND circuit 469 and EXCLUSIVE-OR circuit 467) as it is shifted into the stage M30. This procedure is adequate for correcting all the message digits, but it might leave two redundant digits uncorrected. The AND circuit 470 passes the 30th shift pulse to the STOP lead, thereby ending the sequence.

It is noted that, with one exception, the component circuits out of which the specific illustrative decoder depicted in FIGS. 4 through 6 is formed are well known in the art and completely conventional, and are, accordingly, not depicted in detail in the drawing. The single exception relates to the shift registers 427, 428, and 429 shown in FIG. 4, which may, for example, be of the form depicted in FIG. 7A of my above-cited copending application.

It is to be understood that the above-described arrangements are illustrative of the application of the principles of the present invention. Numerous other arrangements may be devised by those skilled in the art without departing from the spirit and scope of the invention. For example, although emphasis herein has been directed to applying the principles of this invention to the correction of errors which occur on a transmission channel that interconnects spaced encoding and decoding units, it is to be understood that these principles are equally applicable to the correction of errors in information processing equipment which is positioned at a single location. Specifically, the principles of the present invention are to be understood to apply to the correction of errors which occur in the internal circuitry of such equipment.

What is claimed is:

1. In combination in a self-correcting digital information system which includes a transmission channel subject to end-connected or interior error bursts, an encoder comprising means for supplying information digits, timing means for coupling synchronization digits to said channel, shift register means responsive to the output of said supplying means for serially applying said information digits to said channel via the output stage of said shift register means, means for generating check digits and for serially applying said check digits to the input stage of said shift register means, said generating and applying means including means responsive to information digits appearing in spaced ones of the stages of said shift register for providing two sets of check digits to be suffixed to each information word, said providing means including means for deriving the check digits of one set so as to establish only even parity relationships between said information digits and the check digits of both sets and for deriving the check digits of the other set so as to establish both even parity relationships and an even number of odd parity relationships between said information digits and the check digits of both sets; and a decoder coupled to said channel for receiving therefrom said information and synchronization digits, said decoder including means for determining whether a received sequence of digits is characterized by an end-connected or an interior error burst, means responsive to the detection of an end-connected error burst for locating the position in the received sequence of a reference information digit and for then reconstructing erroneously-received information digits, which are within the error-correcting capabilities of said system and parity circuit means responsive to the detection of an interior error burst for reconstructing erroneously-received information digits which are within the error-correcting capabilities of said system.

2. In combination in a self-correcting digital information system which includes a transmission channel subject to end-connected error bursts, an encoder comprising means for supplying information digits, timing means for coupling synchronization digits to said channel, shift register means responsive to the output of said supplying means for serially applying said information digits to said channel via the output stage of said shift register means, means for generating check digits and for serially applying said check digits to the input stage of said shift register means, said generating and applying means including means responsive to information digits appearing in spaced ones of the stages of said shift register for providing two sets of check digits to be suffixed to each information word, said providing means including means for deriving the check digits of one set so as to establish only even parity relationships between said information digits and the check digits of both sets and for deriving the check digits of the other set so as to establish both even parity relationships and an even number of odd parity relationships between said information digits and the check digits of both sets; and a decoder coupled to said channel for receiving therefrom said information and synchronization digits, said decoder including means for detecting the occurrence in a received sequence of an end-connected error burst, means for locating the position in the received sequence of a reference information digit, and parity circuit means responsive to the determination of the occurrence of an end-connected error burst which is within the error-correcting capabilities of said system for reconstructing the information digits preceding the reference one.

3. In combination in a self-correcting digital information system which includes a transmission channel subject to interior error bursts, an encoder comprising means for supplying information digits, shift register means responsive to the output of said supplying means for serially applying said information digits to said channel via the output stage of said shift register means, means for generating check digits and for serially applying said check digits to the input stage of said shift register means, said generating and applying means including means responsive to information digits appearing in spaced ones of the stages of said shift register for providing two sets of check digits to be suffixed to each information word, said providing means including means for deriving the check digits of one set so as to establish only even parity relationships between said information digits and the check digits of both sets and for deriving the check digits of the other set so as to establish both even parity relationships and an even number of odd parity relationships between said information digits and the check digits of both sets; and a decoder coupled to said channel for receiving therefrom said information digits, said decoder including a shift register for storing therein received information digits, means coupled to said channel for gating information digits into said shift register, and parity circuit means responsive to the occurrence of an interior error burst in an information digit sequence for recirculating said information digits through said shift register and in so doing reconstructing erroneously-received information digits which are within the error-correcting capabilities of said system.

4. In combination in a self-correcting binary information system which includes a transmission channel subject to error bursts, an encoder comprising means for supplying information digits, means for timing said supplying means and for providing synchronization digits, shift register means responsive to the output of said supplying means for serially applying said information digits to said channel, generating means including means responsive to information digits appearing in spaced ones of the stages of said shift register for providing two sets of check digits to be suffixed to each information word, said generating means including means for deriving one set of check digits from only even parity relationships and for deriving the other set of check digits from both even and odd parity relationships, and means for coupling said synchronization digits to said channel.

5. In combination in a self-correcting binary information system which includes a transmission channel subject to error bursts, an encoder comprising a source of information words, a shift pulse source, a multistage shift register responsive to the outputs of said information source and said shift pulse source for serially applying the digits of an information word via the output stage of said shift register to said channel, and means responsive to the output of said shift pulse source and to the states of spaced stages of said shift register for generating two sets of parity check digits and for applying said digits to the input stage of said shift register, said generating and applying means including circuitry for deriving the check digits of one set so as to establish only even parity relationships between the information digits and the check digits of both sets and for deriving the check digits of the other set so as to establish even parity relationships and an even number of odd parity relationships between the information digits and the check digits of both sets.

6. In combination in a encoder, first means for supplying information digits, second means for supplying shift pulses, first multistage shift register means responsive to the outputs of said first and second supplying means for serially applying digital signals to a channel, second multistage shift register means responsive to the output of said second supplying means and having its output stage connected to the input stage of said first shift register means, first parity check means responsive to the states of spaced stages of said first and second shift register means for generating a first plurality of check digits, and second parity check means responsive to the states of spaced stages of said first shift register means for generating a second plurality of check digits, said first parity check means including circuitry for generating said first plurality of check digits so as to establish even parity relationship between said information digits and said first and second plurality of check digits, and said second parity check means including circuitry for generating said second plurality of check digits so as to establish even parity relationships and an even number of odd parity relationships between said information digits and said first and second plurality of check digits.

7. In combination in a system for redundantly encoding an information word by suffixing thereto two sets of parity check digits, multistage means for storing the digits of an information word, means responsive to the stored values of spaced digits of said information word for generating the parity check digits of one set so as to establish even parity relationships between the information digits and the check digits of the two sets, and means responsive to the stored values of different spaced digits of said information word for generating the parity check digits of the other set so as to establish even parity relationships and an even number of odd parity relationships between the information digits and the check digits of the two sets.

8. In combination in an encoder that modifies information words which are to be transferred to a noisy channel, means for storing signals representative of the digits of an information word, means responsive to the values of selected ones of the signals contained in said storing means for generating two sets of parity check digits, said generating means including first means for establishing even parity relationships between the check digits of one set and the information digits and the check digits of both sets, and said generating means also including second means for establishing even parity relationships and an even number of odd parity relationships between the check digits of the other set and the information digits and the check digits of both sets.

9. A combination as in claim 8 wherein said storing means comprises a multistage main shift register having an output stage which is connected to said channel, and further including means for serially shifting the signals stored in said main shift register to said channel via said output stage.

10. A combination as in claim 9 wherein said multistage main shift register includes an input stage, and further including means responsive to said shifting means for applying one of the digits of the two sets of parity check digits to said input stage each time that a digit is shifted from said output stage to said channel.

11. A combination as in claim 10 further including a pulse source, and a multistage auxiliary shift register having an output stage which is connected to the input stage of said main shift register, and wherein said second means includes circuitry for performing the modulo 2 sum of the output of said pulse source and the values stored in spaced stages of said main shift register and for applying the sum to the input stage of said auxiliary shift register.

12. A combination as in claim 11 wherein said first means includes circuitry for performing the modulo 2 sum of the values stored in spaced stages of said main and auxiliary shift registers and for applying the sum to the input stage of said main shift register.

13. In combination in a decoding system which is connected to a noisy transmission channel to receive therefrom a mutilated sequence of information and synchronization digits, means for determining whether the received sequence includes an end-connected or an interior error burst, means responsive to the detection of an end-connected error burst for locating the position in the received sequence of a reference information digit and for then reconstructing erroneously-received information digits which are within the error-correcting capabilities of said system, and parity circuit means responsive to the detection of an interior error burst for reconstructing erroneously-received information digits which are within the error-correcting capabilities of said system.

14. In combination in a decoding system which is connected to a noisy channel to receive therefrom a mutilated sequence of information and synchronization digits whose mutilation is within the error-correcting capabilities of said system, means for detecting the occurrence in the received sequence of an end-connected error burst and for locating the position in the received sequence of a reference information digit, and parity circuit means responsive to the detection of the occurrence of an end-connected error burst and to the location of the reference digit for reconstructing all information digits preceding the reference one.

15. In combination in a decoding system which is connected to a noisy channel to receive therefrom a mulitated sequence of information digits whose mutilation is within the error-correcting capabilities of said system, shift register means for storing information digits, means coupled to said channel for gating said information digits into said shift register means, means for recirculating said information digits through said shift register means, and parity circuit means responsive to the occurence of an interior error burst in an information digit sequence for reconstructing all erroneously-received information digits as the information digit sequence is recirculated through said shift register means.

References Cited in the file of this patent

UNITED STATES PATENTS

Re. 23,601 Hamming et al. -------- Dec. 23, 1952

OTHER REFERENCES

Green et al.: "An Error Correcting Encoder and Decoder of High Efficiency," Proceedings of the I.R.E., October 1958 (4 pages).